US008561026B2

(12) United States Patent
Bakowski

(10) Patent No.: US 8,561,026 B2
(45) Date of Patent: Oct. 15, 2013

(54) METHOD, APPARATUS AND COMPUTER PROGRAM FOR FACILITATING THE IMPROVEMENT OF A USER INTERFACE

(75) Inventor: Ben Bakowski, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/277,646

(22) Filed: Nov. 25, 2008

(65) Prior Publication Data

US 2009/0138833 A1 May 28, 2009

(30) Foreign Application Priority Data

Nov. 27, 2007 (EP) .................................... 07121622

(51) Int. Cl.
*G06F 9/44* (2006.01)

(52) U.S. Cl.
USPC ............................ 717/124; 717/127; 717/134

(58) Field of Classification Search
None
See application file for complete search history.

(56) References Cited

U.S. PATENT DOCUMENTS

| | | | | |
|---|---|---|---|---|
| 5,724,262 A * | 3/1998 | Ghahramani | ................ | 702/186 |
| 5,768,578 A * | 6/1998 | Kirk et al. | ............... | 1/1 |
| 6,195,616 B1 * | 2/2001 | Reed et al. | .................. | 702/119 |
| 6,549,896 B1 * | 4/2003 | Candan et al. | ........................ | 1/1 |
| 6,671,711 B1 * | 12/2003 | Pirolli et al. | .................. | 709/200 |
| 6,735,596 B2 * | 5/2004 | Corynen | ............................. | 1/1 |
| 6,907,546 B1 * | 6/2005 | Haswell et al. | ............... | 717/134 |
| 7,233,950 B2 * | 6/2007 | Smith, III | ............................ | 1/1 |
| 7,305,622 B2 * | 12/2007 | Cohen et al. | ................... | 715/736 |
| 7,337,432 B2 * | 2/2008 | Dathathraya et al. | ......... | 717/125 |
| 7,464,010 B2 * | 12/2008 | Yang et al. | ...................... | 703/24 |
| 7,493,611 B2 * | 2/2009 | Martin | ......................... | 717/157 |
| 7,502,728 B1 * | 3/2009 | Hurlock et al. | ............... | 717/134 |
| 7,548,842 B2 * | 6/2009 | Ganesan et al. | ............. | 717/134 |
| 7,673,019 B2 * | 3/2010 | Chi et al. | ...................... | 709/219 |
| 7,779,013 B2 * | 8/2010 | Chi et al. | ...................... | 707/748 |
| 7,827,536 B2 * | 11/2010 | Armstrong et al. | ........... | 717/127 |
| 7,877,407 B2 * | 1/2011 | Smith, III | ..................... | 707/774 |
| 7,930,700 B1 * | 4/2011 | Basu et al. | ..................... | 717/127 |
| 8,099,697 B2 * | 1/2012 | Matsuda et al. | .............. | 717/127 |
| 8,165,916 B2 * | 4/2012 | Hoffberg et al. | ........... | 705/14.53 |
| 8,166,464 B2 * | 4/2012 | Lin et al. | ....................... | 717/124 |
| 8,332,807 B2 * | 12/2012 | Finlayson et al. | ............ | 717/124 |
| 8,359,186 B2 * | 1/2013 | Ganesan et al. | .............. | 717/134 |
| 8,396,737 B2 * | 3/2013 | Lakshminarayan et al. | . | 705/7.29 |
| 8,438,534 B2 * | 5/2013 | Thomson et al. | ............. | 717/127 |
| 2002/0091996 A1 * | 7/2002 | Topham | ........................ | 717/127 |

(Continued)

OTHER PUBLICATIONS

Kieras, "GOMS Models for Task Analysis", 2004 Lawrence Erlbaum Associates; [retrieved on Feb. 22, 2012]; Retrieved from Internet <URL:http://ai.eecs.umich.edu/people/kieras/docs/TA_Modeling/GOMStorTA.pdf>;pp. 1-33.*

(Continued)

*Primary Examiner* — Thuy Dao
*Assistant Examiner* — Xi D Chen
(74) *Attorney, Agent, or Firm* — Douglas A. Lashmit; Hoffman Warnick LLC

(57) ABSTRACT

There is disclosed a method, apparatus and computer program for facilitating improvement of a user interface. A plurality of critical paths though the user interface are determined. A complexity of each of the critical paths is calculated. The complexity of the critical paths relative to a level of criticality of those paths is then indicated.

14 Claims, 13 Drawing Sheets

Generate Route Map of possible paths (panes) within a user interface & the complexity of those panes

(56) References Cited

U.S. PATENT DOCUMENTS

| | | | | |
|---|---|---|---|---|
| 2002/0151992 | A1* | 10/2002 | Hoffberg et al. | 700/83 |
| 2003/0005413 | A1* | 1/2003 | Beer et al. | 717/125 |
| 2003/0066061 | A1* | 4/2003 | Wu et al. | 717/158 |
| 2004/0111706 | A1* | 6/2004 | Mogul et al. | 717/124 |
| 2004/0154002 | A1* | 8/2004 | Ball et al. | 717/134 |
| 2005/0172270 | A1* | 8/2005 | Dathathraya et al. | 717/124 |
| 2005/0229017 | A1* | 10/2005 | Webster et al. | 713/320 |
| 2006/0199167 | A1* | 9/2006 | Yang et al. | 434/365 |
| 2007/0106758 | A1* | 5/2007 | Chi et al. | 709/219 |
| 2007/0162874 | A1* | 7/2007 | Lauff et al. | 715/840 |
| 2008/0183745 | A1* | 7/2008 | Cancel et al. | 707/102 |
| 2009/0044106 | A1* | 2/2009 | Berkner et al. | 715/273 |
| 2009/0172529 | A1* | 7/2009 | Jas et al. | 715/700 |
| 2009/0235262 | A1* | 9/2009 | Ceze et al. | 717/124 |
| 2009/0328002 | A1* | 12/2009 | Lin et al. | 717/124 |

OTHER PUBLICATIONS

Rauterberg, "How to Measure Cognitive Complexity in Human-Computer Interaction", 1996, Proceedings of the 13$^{th}$ European Meeting on Cybermetics and Systems Research; [retrieved on Feb. 23, 2012]; Retrieved from Internet <URL:http://alexandria.tue.nl/respository/freearticles/586964.pdf>;pp. 815-820.*

Cowley et al., "Toward an Understanding of Flow in Video Games", 2008 ACM Computers in Entertainment; [retrieved on Feb. 23, 2012]; Retrieved from Internet <URL:http://dl.acm.org/citation.cfm?id=1371223>;pp. 20.1-20.27.*

Sears, "Automated metrics for user interface design and evaluation", 1994 International Journal of Nio-Medical Computing; [retrieved on Feb. 22, 2012]; Retrieved from Internet <URL:http://www.ncbi.nlm.nih.gov/pubmed/8125628?>;pp. 149-157.*

Baber, Mellor, "Using critical path analysis to model multimodal human-computer interaction", 2001, Int. J. Human-Computer Studies; [retrieved on Feb. 22, 2012]; Retrieved from Internet <URL:http://www.sciencedirect.com/science/article/pii/S107158190090452X>;pp. 613-636.*

Aparicio, "Find the information you want on the web, how likely could be get it successfully?", 2006, IADIS International Conference e-Society; [retrieved on Feb. 21, 2012]; Retrieved from Internet <URL:http://www.iadis.net/dl/final_uploads/200604S123.pdf>;pp. 275-279.*

Gillan, Cooke, "Using Pathfinder Networks to Analyze Procedural Knowledge in INteractions with Advanced Technology", 2001, Elsevier Science Ltd.; [retrieved on Feb. 23, 2012]; Retrieved from Internet <URL:http://www.idemployee.id.tue.nl/g.w.m.rauterberg/amme/Gillan-Coke-2001.pdf>;pp. 125-161.*

Ivory, Hearst, "The State of the Art in Automating Usability Evaluation of User Interfaces", 2001, ACM Computing Surveys; [retrieved on Feb. 21, 2012]; Retrieved from Internet <URL:http://dl.acm.org/citation.cfm?id=503114>;pp. 470-516.*

Ivory, "An Empirical Foundation for Automated Wev Interface Evaluation", 2001, Computer Science Dept., University of California at Berkeley;[retrieved on Feb. 21, 2012]; Retrieved from Internet <URL:http://webtango.berkeley.edu/papers/thesis/thesis.pdf>;pp. 1-288.*

John, Kieras, "Using GOMS for User INterface Design and EValuation: Which Technique?", 1996, ACM Transactions on Computer-Human INteraction; [retrieved on Feb. 22, 2012]; Retrieved from Internet <URL:http://dl.acm.org/citation.cfm?id=236050>;pp. 387-319.*

Helfrich, Landay, "QUIP: Quantitative User Interface Profiling", publised on 1999 on http:/home.earthlink.net/~bhelfrich/quip/quip-chi99-21.pdf; [retrieved on Jun. 12, 2012]; Retrieved from Internet <URL:http://citeserx.ist.psu.edu/viewdoc/download?doi=10.1.1.37.2367&rep=rep1&type=pdf>; pp. 1-2.*

Ivory, Hearst, "The State of the Art in Automating Usability Evaluation of User Interfaces", 2001, ACM Computing Surveys; [retrieved on Jun. 11, 2012]; Retrieved from Internet <URL:http://dl.acm.org/citation.cfm?id=503114>; pp. 470-516.*

Bucur, et al., "Parallel Symbolic Execution for Automated Real-World Software Testing", 2011 ACM; [retrieved on Jun. 4, 2013]; Retrieved from Internet <URL:http://dl.acm.org/citation.cfm?id=1966445>;pp. 183-197.*

Kiciman, Livshits "AjaxScope: A Platform for Remotely Monitoring the Client-Side Behavior of Web 2.0 Applications", 2010 ACM; [retrieved on Jun. 4, 2013]; Retrieved from Internet <URL:http://dl.acm.org/citation.cfm?id=1841909>;pp. 13:1-12:52.*

Bygren, et al., "Applying the Fundamentals of Quality to Software Acquisition", 2012 IEEE; [retrieved on Jun. 4, 2013]; Retrieved from Internet <URL:http://ieeexplore.ieee.org/stamp/stamp.jsp?tp=&arnumber=6189447>;pp. 1-6.*

Hsu, et al., "An Adaptive Reliability Analysis Using Path Testing for Complex Component-Based Software Systems", 2011 IEEE; [retrieved on Jun. 4, 2013]; Retrieved from Internet <URL:http://ieeexplore.ieee.org/stamp/stamp.jsp?tp=&arnumber=5701674>;pp. 158-170.*

Riedl et al., "Toward Automated Exploration of Interactive Systems", IUI '02, Jan. 13-16, 2002, San Francisco, California, USA.

PubMed, "Automated Metrics for User Interface Design and Evaluation", Int J Biomed Comput, Jan. 1994, 34(1-4), pp. 149-157, http://www.ncbi.nlm.nih.gov/pubmed/8125628?dopt=Abstract.

* cited by examiner

METHOD, APPARATUS AND COMPUTER PROGRAM FOR FACILITATING THE IMPROVEMENT OF A USER INTERFACE

FIELD OF THE INVENTION

The invention relates to user interface design and more specifically to a solution for facilitating the improvement of key areas of a user interface.

BACKGROUND OF THE INVENTION

As applications become increasingly powerful, a key target in developing successful software is to provide functionality in as a simple and consumable way as possible. The functionality provided by applications is presented to the user through a User Interface (UI), which themselves have seen a corresponding increase in complexity as the capabilities of the underlying application grows. Given that the UI acts as the boundary between the user and the application, a poorly designed or overly complex UI can markedly reduce a user's satisfaction with the product, or even prevent the user from benefiting from the application's capabilities.

For the purpose of the discussion herein, the complexity of a UI is defined by its "navigability" (the ease of navigating through the UI) and its "simplicity" (the ease of exercising functionality presented by the UI). Navigability reflects, for example, how many panels the user has to navigate through to perform a given task, while simplicity reflects for example the number of possible data fields/actions a user has to fill/perform to execute a defined functional task in the application. Overall complexity is often a delicate balance between navigability and simplicity. Attempting to improve navigability, by reducing the number of panels to navigate through, has the consequence of worsening its simplicity; in other words, it becomes harder for the user to identify necessary actions on a given panel, as it becomes increasingly overloaded with options.

There are several problems facing architects, developers and testers of UIs. For example, although significant effort is conventionally spent in testing an application's core functionality, the UI traditionally receives less attention and is treated subjectively rather than undergoing objective analysis. This is surprising given the recognition of its importance, but may reflect a lack of tooling and unbiased approaches. Further, it has been appreciated by the inventors that a new user's first impression is typically gained through exercising core ("Golden Path") tasks, and thus that it is important to ensure that such tasks are the simplest, even at the possible expense of increased complexity for less-frequently used "advanced" tasks.

There is currently a lack of tools to measure quantitatively and objectively the complexity of a UI. Further, current tooling gives a very poor view of complexity in relation to the rest of the interface under test, particularly concerning the importance of Golden Paths.

SUMMARY OF THE INVENTION

According to a first aspect, there is provided a method for facilitating improvement of a user interface, the method comprising: determining a plurality of critical paths through the user interface; calculating a complexity of each of the critical paths; and indicating the complexity of the critical paths relative to a level of criticality of those paths.

A path may be critical (golden) if it is one that is frequently exercised by users. Alternatively, a path may be critical if it is the least complex route to a node which users have identified as critical. A solution has been disclosed where a user-interface designer may be provided with an indication of the complexity of the critical paths relative to a level of criticality (goldenness) of those paths. In other words, one path may be more critical than another and this is indicated relative to the complexity of those paths. For example, path A may be more critical than path B and in addition path A may be more complex than path B. If a path is both relatively more critical and relatively more complex, then attention to the user-interface (path A) may be required.

In one embodiment, paths exercised by users of the user interface are monitored and the most frequently exercised paths are identified as critical paths.

In one embodiment users identify nodes within the user interface as fulfilling their goals. A least complex route through the user interface to each of the identified nodes is then calculated. Such routes calculated comprise critical paths.

In one embodiment, a user assigns a weighting to each node identified as fulfilling a user's goal.

In one embodiment, the weighting assigned to a final node (identified as fulfilling a user's goal) in a critical path is identified. That weighting is applied to the complexity associated with the critical path to create a weighted complexity.

In one embodiment, the weighted complexity of each critical path relative to a level of criticality of those paths is indicated.

In one embodiment, the complexity of nodes forming part of critical paths is identified.

In one embodiment, for each node, at least one of the following is determined: depth of the node; the breadth of the node; the number of transitions from the node to another node; and the number of data fields that have to be filled in to reach the node.

According to a second aspect, there is provided an apparatus for facilitating improvement of a user interface, the apparatus comprising: determining a plurality of critical paths through the user interface; calculating a complexity of each of the critical paths; and indicating the complexity of the critical paths relative to a level of criticality of those paths.

The invention may be implemented in computer software.

BRIEF DESCRIPTION OF THE DRAWINGS

Embodiments of the present invention will now be described, by way of example only, and with reference to the following drawings.

DETAILED DESCRIPTION OF THE INVENTION

Tooling is provided which is capable of measuring complexity of a user interface. The solution disclosed takes into account the paths most frequently exercised by users (Golden Paths).

Figure 1:
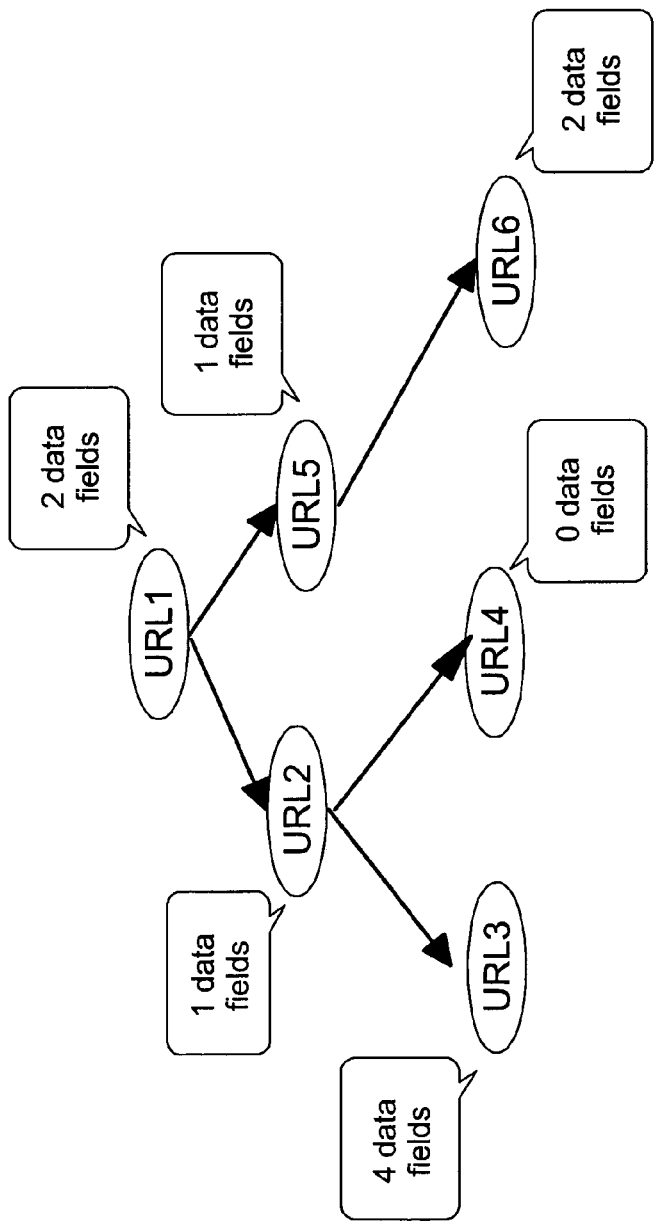
FIG. 1 illustrates an exemplary user interface.

FIG. 1 illustrates the structure of an exemplary user interface. For explanatory purposes, this user interface is shown as a simple tree of nodes. It will however be appreciated that more complicated grid structures are also envisaged. This will be addressed in more detail below on.

With reference to FIG. 1, this diagram has a root web page identified as URL1. URL1 has links (transitions) to its two children URL2 and URL5, which each have in turn have transitions to their children URL3, URL4 and URL6. Each web page may additionally have a number of data fields which need input before a transition to another page is made. This is also shown on FIG. 1. FIG. 1 also shows directionality of the transitions via arrows. It should however be appreciated that this does not preclude the possibility of a user retracing their steps via, for example, the use of the browser "back" arrow.

Whilst the example is of a web site including a plurality of web pages, it should be appreciated that the invention is not limited to such. The invention is equally applicable to other types of user interface where a user can transition between multiple panes, pages, etc.

Figure 2A:
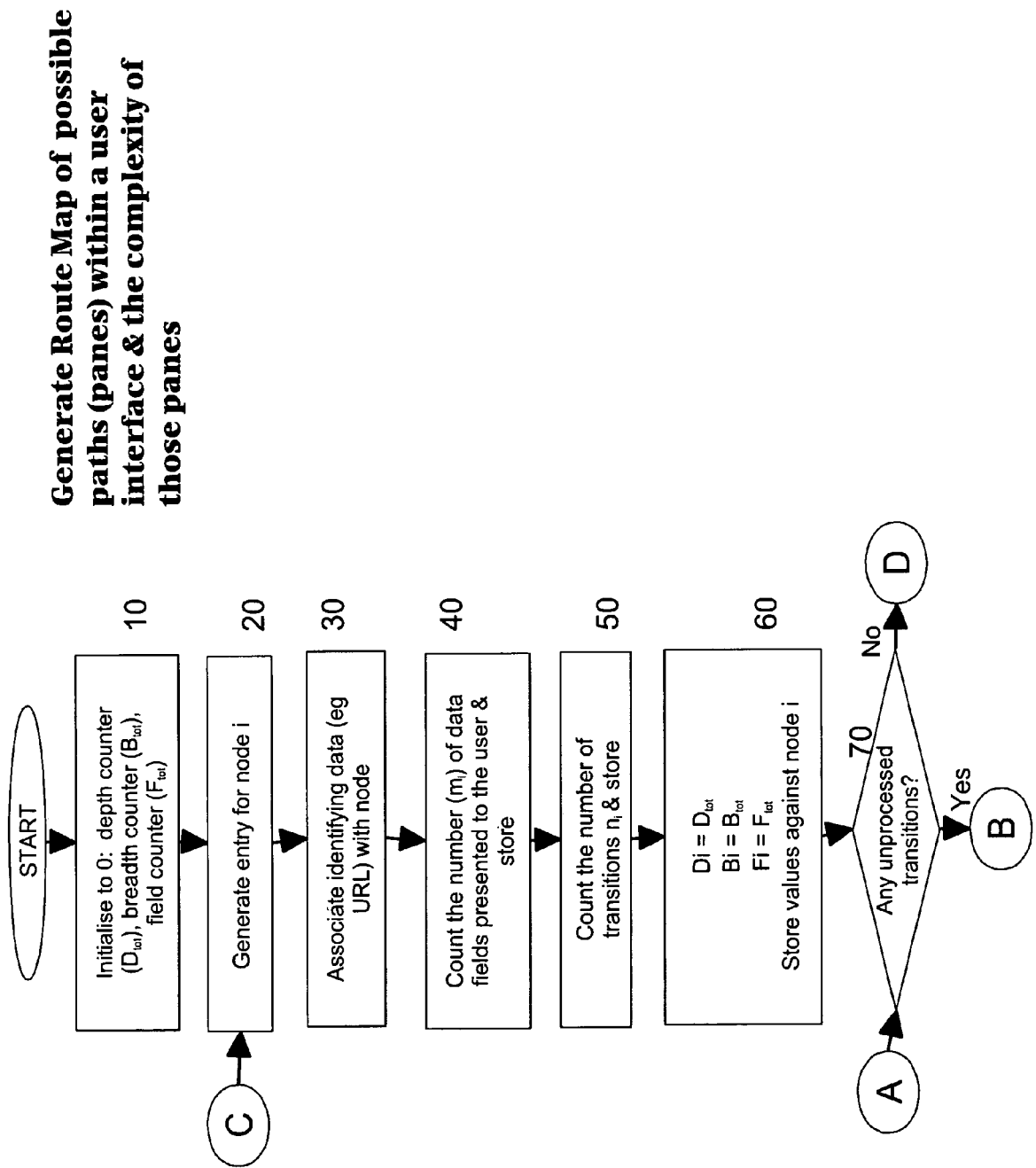
FIGS. 2a, 2b and 2c show, in accordance with a first embodiment of the present invention, the process of generating a route map of possible paths within a user interface.
Figure 2B:
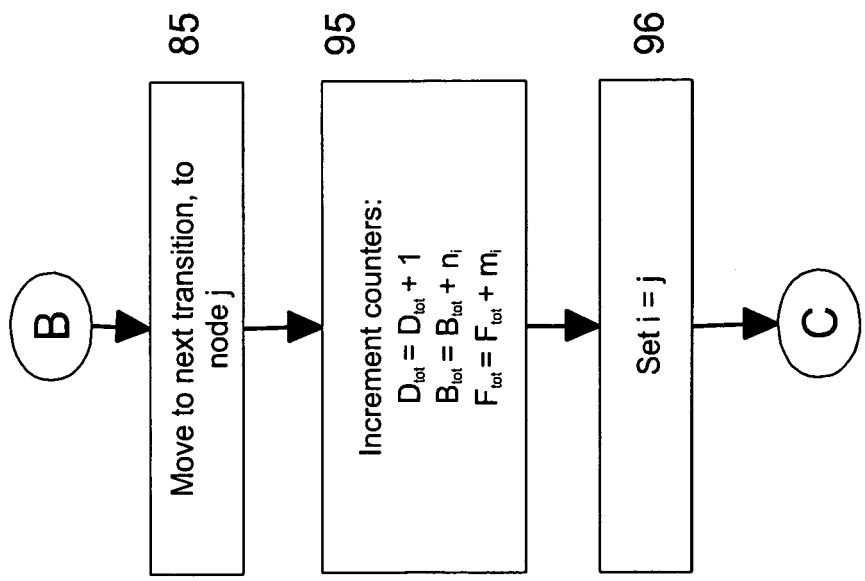

FIGS. 2a and 2b show, in accordance with an embodiment, the generation of a conceptual route map of possible paths (nodes) within a user interface and also the determination of the complexity of these nodes.

At step 10 the following counters are initialised to 0: a depth counter ($D_{tot}$), an accumulated breadth counter ($B_{tot}$) and an accumulated data fields counter ($F_{tot}$). The breadth counter is used to determine the navigability of a given node, by tracking the number of alternative transitions en-route to the node. The depth counter is for determining which level and the number of data fields counter is used to determine the number of data fields a user has to input to reach the current node. The conceptual route map that is generated is held as a database having the following entries for each node in the user interface:
(i) a node (e.g., URL) identifier;
(ii) the number of data fields (m);
(iii) the accumulated depth of the node;
(iv) the accumulated breadth of the node;
(v) the number of data fields needed to be filled in to reach the current node; and
(vi) the number of transitions for a node (n)

At step 20, an entry for the current node (node i) is generated in the database. Identifying information is then associated with the node. For example, a current web page may have a particular URL associated with it (e.g., URL1).

The number of data fields ($m_i$) presented to the user as part of the current node is then counted and stored in the database to update $m_i$ (step 40). At step 50, the number of transitions (n) from the current node (i) to another node are counted and stored in the database. The depth for the current node ($D_i$) is then made equal to $D_{tot}$. The breadth for the current node ($B_i$) is then made equal to $B_{tot}$ and the number of accumulated data fields $F_i$ is then made equal to $F_{tot}$. These values are all stored against node i in the database (step 60).

The $D_{tot}$, $B_{tot}$ and $F_{tot}$ counters are all used respectively to complete the database entries for the current node i.

Thus for the root node (URL1) of FIG. 1, the entry generated looks as follows:

| Identifier | Number of data fields (m) | Depth | Accumulated Breadth | Accumulated Number of Data Fields | Number of transitions (n) |
|---|---|---|---|---|---|
| URL1 | 2 | 0 | 0 | 0 | 2 |

It is determined at step 70 whether there are any unprocessed transitions.

Since only the root node (URL1) has been processed, the answer is yes (URL2 & URL5) and processing proceeds to FIG. 2b, step 85. The system moves to the next transition (i.e., node j) URL2 (step 85). At step 95 counters are incremented as follows:

$D_{tot}=D_{tot}+1$ (becomes 1), $B_{tot}=B_{tot}+n_i$ (i.e., $n_i$ is 2 and $B_{tot}$ becomes 2) and $F_{tot}=F_{tot}+m_i$ (i.e., $m_i$ is 2 and $F_{tot}$ becomes 2).

At step 96 i is set to the value of j. An entry is then generated for URL2 in the database (step 20), identifying information is associated with this entry (step 30). The number of data fields is counted for the current node and stored at step 40. The number of transitions $n_i$ is counted and stored at step 50 and this is stored in the database.

At step 60, $D_i$ is set to $D_{tot}$, $B_i$ is set to $B_{tot}$ and $F_i$ is set to $F_{tot}$. These values are then stored against node i in the database:

| Identifier | Number of data fields (m) | Depth | Accumulated Breadth | Accumulated Number of Data Fields | Number of transitions (n) |
|---|---|---|---|---|---|
| URL1 | 2 | 0 | 0 | 0 | 2 |
| URL2 | 1 | 1 | 2 | 2 | 2 |

It is determined at step 70 that there is another unprocessed transition to URL3. The system moves to the next transition (node j), URL3 (step 85). At step 95 $D_{tot}$ is incremented by 1 (to become 2); $B_{tot}$ is incremented by the value of n for the previous node i (i.e., 2) and now becomes 4 and the $F_{tot}$ is incremented by $m_i$ (i.e., 1) to become 3. At step 96, i is set to equal j. Processing then loops round to step 20.

An entry is then generated for URL3 in the database (step 20), identifying information is associated with this entry (step 30) and the number of data fields $m_i$ is counted and stored at step 40. The number of transitions $n_i$ is counted at step 50 and this is also associated with the new entry.

At step 60, $D_i$ is set to $D_{tot}$, $B_i$ is set to $B_{tot}$ and $F_i$ is set to $F_{tot}$. These values are stored against node i in the database:

| Identifier | Number of data fields (m) | Depth | Accumulated Breadth | Accumulated Number of Data Fields | Number of transitions (n) |
|---|---|---|---|---|---|
| URL1 | 2 | 0 | 0 | 0 | 2 |
| URL2 | 1 | 1 | 2 | 2 | 2 |
| URL3 | 4 | 2 | 4 | 3 | 0 |

It is determined at step 70 that there are no unprocessed transitions and at step 80 that URL3 is not the root node. At step 90 the system moves up a level to node k (i.e., moves back to the node last visited) and $D_{tot}$ is decremented by 1 to become 1, $B_{tot}$ is decremented by the new value of n (2) to become 2 and $F_{tot}$ is decremented by the new value of m (1) to become 2. In other words the new values should correspond to the values listed against URL2 in the database. At step 97 i is set to equal k.

It is determined at step 70 that URL2 has one more unprocessed transition URL4. Consequently the system moves to the next transition (j) URL4 at step 85. At step 95, $D_{tot}$ is incremented by 1 to become 2, $B_{tot}$ by $n_i$ (2) to become 4. Also at step 95, $F_{tot}$ is incremented by $m_i$ (1) to become 3. At step 96 i is set to the value of j. Processing then continues with step 20.

At step 20, a new entry for URL4 is generated and at step 30 identifying data is associated with this entry. The number of data fields ($m_i$, 0) is counted and stored in the database at step 40. At step 50, the number of transitions ($n_i$) from the current node are counted and stored.

At step 60, $D_i$ is set to $D_{tot}$, $B_i$ is set to $B_{tot}$ and $F_i$ is set to $F_{tot}$. Theses values are stored against node i:

| Identifier | Number of data fields (m) | Depth | Accumulated Breadth | Accumulated Number of Data Fields | Number of transitions (n) |
|---|---|---|---|---|---|
| URL1 | 2 | 0 | 0 | 0 | 2 |
| URL2 | 1 | 1 | 2 | 2 | 2 |
| URL3 | 4 | 2 | 4 | 3 | 0 |
| URL4 | 0 | 2 | 4 | 3 | 0 |

The system then moves back up the tree to process URL5 and URL6.

Finally the system is back at root node URL1 and it is determined that there are no unprocessed transitions at step 70. It is further determined at step 80 that URL1 is the root node. Consequently processing ends.

The database now looks as follows:

| Identifier | Number of data fields (m) | Depth | Accumulated Breadth | Accumulated Number of Data Fields | Number of transitions (n) |
|---|---|---|---|---|---|
| URL1 | 2 | 0 | 0 | 0 | 2 |
| URL2 | 1 | 1 | 2 | 2 | 2 |
| URL3 | 4 | 2 | 4 | 3 | 0 |
| URL4 | 0 | 2 | 4 | 3 | 0 |
| URL5 | 1 | 1 | 2 | 2 | 1 |
| URL6 | 2 | 2 | 3 | 3 | 0 |

Figure 3:
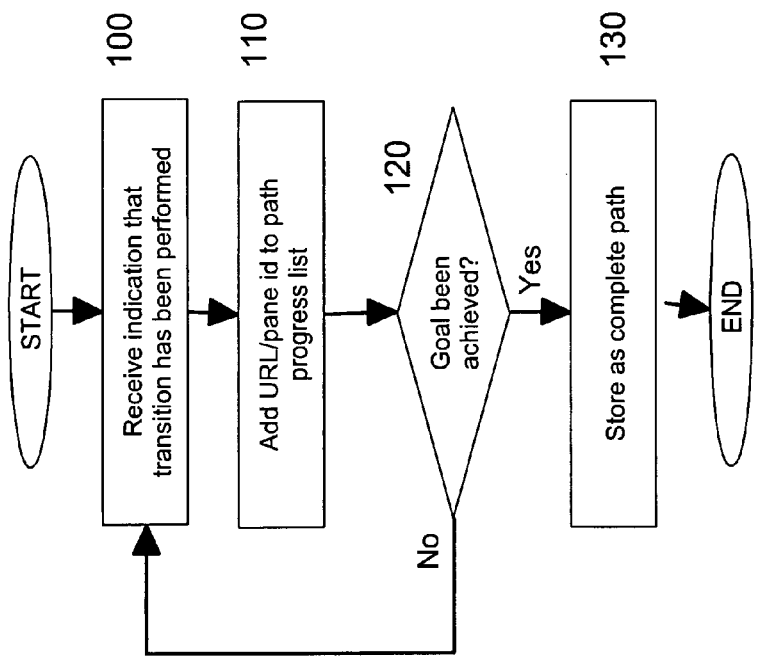
FIG. 3 illustrates, in accordance with a first embodiment of the present invention, the process of modelling user behaviour.

Having generated an internal route map of the possible nodes that a user may visit in exercising a user interface such as that shown by FIG. 1, some modelling of actual user behaviour is performed. This is shown in FIG. 3.

At step 100, an indication has been received that an action which causes a node transition (e.g., clicking a URL link) has been performed. The node is then added to a path progress list at step 110. It is determined at step 120 whether the user's goal has been achieved. Note, provision is made for the user to indicate this to the system. If the answer is no, then processing loops round. Once the user has indicated that they have achieved their goal, the complete path is stored in a completed paths list at step 130. (The entries in the progress path may be removed).

Modelling of user behaviour may continue for multiple users until the system receives an indication that it is no longer necessary to continue monitoring. The system will then have a list of completed paths that users have followed through the user interface.

Figure 4:
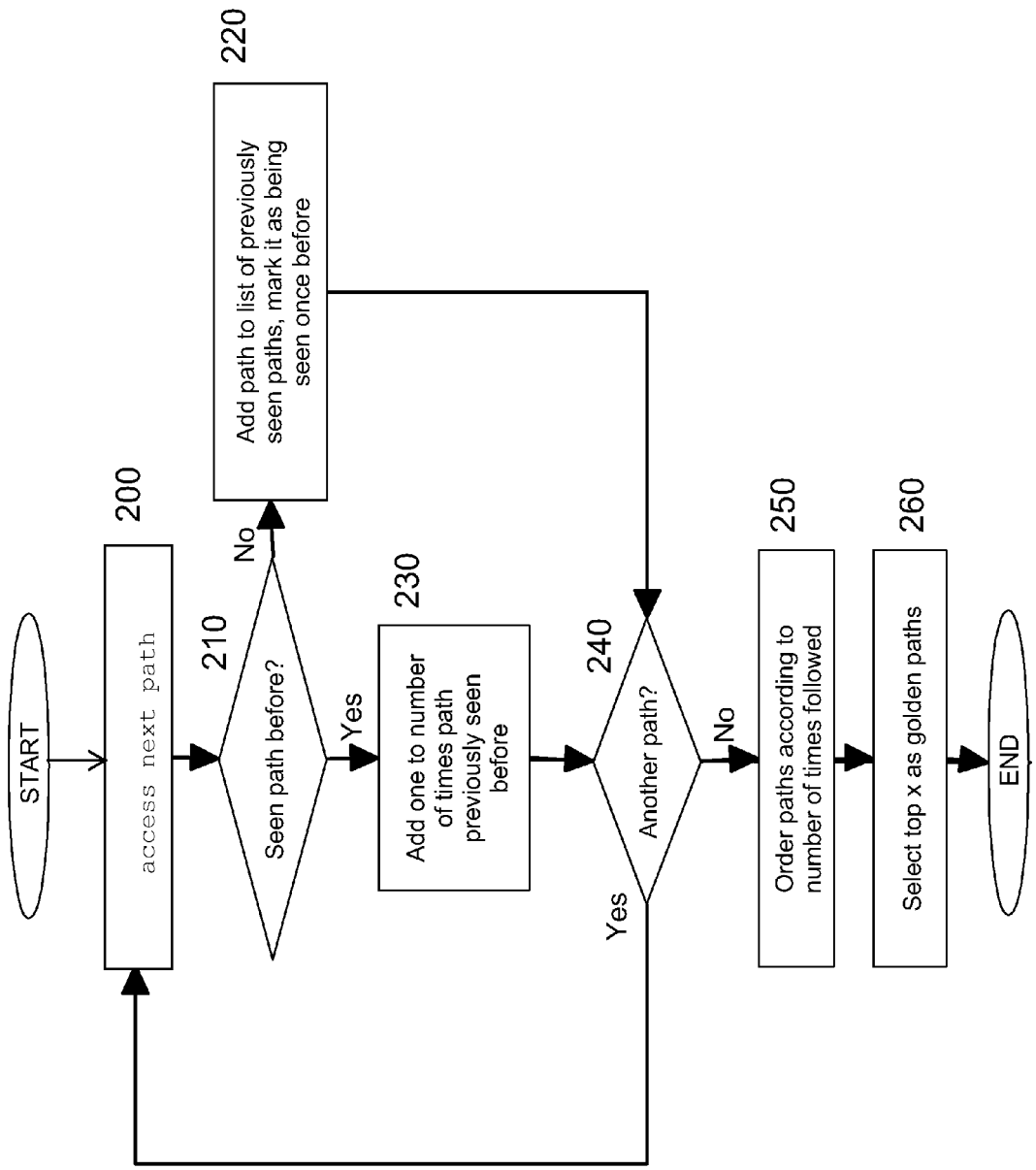
FIG. 4 shows, in accordance with a first embodiment, the process of determining golden paths.

Processing is then performed to determine which of the paths through the user interface are "golden paths"; in other words, which paths are most frequently exercised by users (FIG. 4).

At step 200, the first path in the completed paths list is accessed and the system progresses through the list of paths from top to bottom. It is determined whether this path has been seen before. If this is the first time the path has been seen, then the path is added to a list of previously seen paths and is marked as having been seen once before (step 220). Processing then loops round.

If the path has been seen before, then the number of occurrences of the path is incremented by one in the previously seen paths list (step 230). Processing continues until the previously seen paths list contains a list of all paths modelled according to FIG. 3 and the number of times a user has followed such a path.

At step 250 the previously seen paths list is ordered according to the number of times each path has been followed. At step 260 the top x (system configured number) paths are selected as golden paths.

Figure 5:
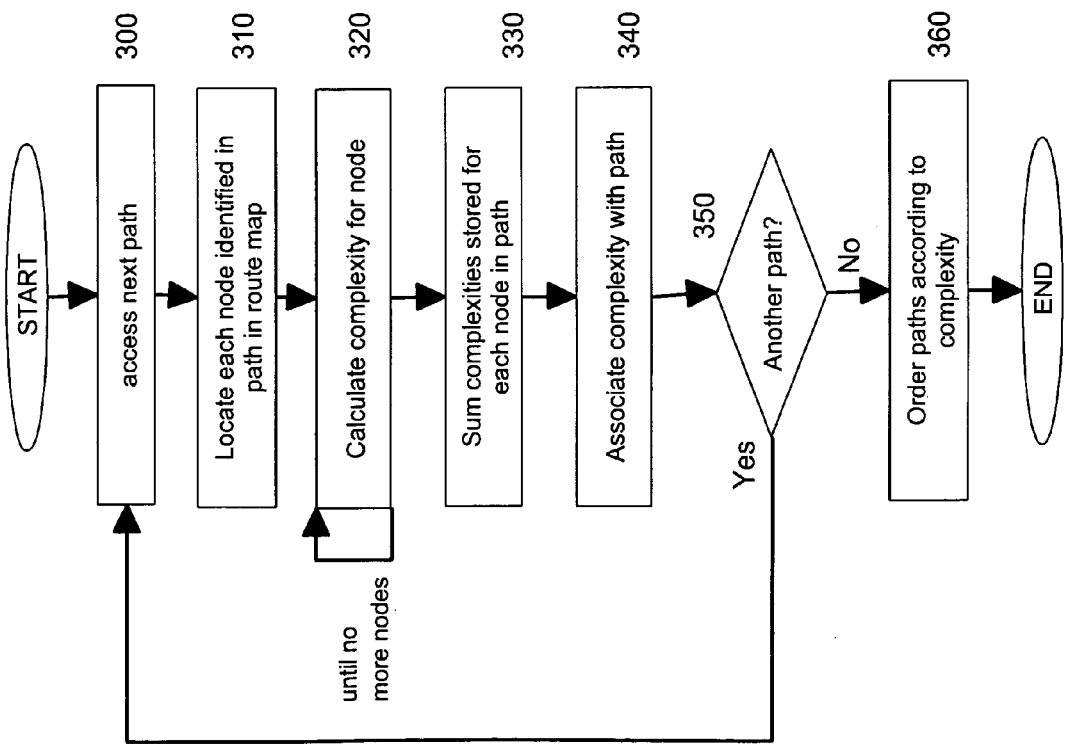
FIG. 5 is a flow chart, in accordance with a first embodiment of the present invention, of the process of calculating the complexity of the determined golden paths.

The system then goes on to calculate a complexity value for each golden path (FIG. 5). By way of example, the golden paths identified are as follows:
1) URL1, URL2, URL3, ULR2, URL4;
2) URL1, URL2, URL3;
3) URL1, URL5, URL6, URL5, URL1, URL2; and
4) URL1, URL5, URL6.

In the example, there are four golden paths listed. At step 300 path 1 is accessed. At step 310, each node identified in the path is located in the route map generated by the processing of FIGS. 2a and 2b. The complexity for each node is then generated at step 320 using an algorithm such as:

$$[D_i+1]*[B_i+1]*[F_i+1]$$

It should be appreciated that "+1" is used to avoid a situation where one of the values equates to 0 and thereby nullifies the whole algorithm. 1 is chosen for the sake of simplicity. Equally each value could be incremented by another number. Also, $D_i$, $B_i$ and $F_i$ could be incremented by different values to give some more weight than others.

Thus for URL 1, the depth ($D_i$) is 0, breadth ($B_i$) 0; and the number of accumulated data fields ($F_i$) 0. Consequently the complexity for node URL1 is 1.

The complexity values for each node in path 1 are shown below:

| Node | Complexity |
|---|---|
| URL1 | 1 |
| URL2 | 18 |
| URL3 | 60 |
| URL4 | 120 |

It will be appreciated that URL2 appears twice in path 1, possibly because users are being sent the wrong way and then have to retrace their steps. There is no need to include URL2 twice in the complexity calculations.

Once the complexity for each individual node in a path has been calculated, then the complexity values can be summed at step 330 in order to determine the overall complexity for a path. Thus for path 1, the total complexity value is:

(1+18+60+18+120)=217.

The complexity value is then associated with the current golden path.

At step 350, it is then determined whether there are any more golden paths and if so, the processing loops round.

Once all the calculations are complete, the information stored will look as follows:

| Path | Complexity |
| --- | --- |
| 1 | 217 |
| 2 | 79 |
| 3 | 140 |
| 4 | 97 |

At step 360, the paths are then ordered according to their complexity:

| Path | Complexity |
| --- | --- |
| 1 | 217 |
| 3 | 140 |
| 4 | 97 |
| 2 | 79 |

It will be appreciated that the paths are numbered according to the frequency with which they are followed. Thus the system has information about which paths are most frequently followed and which are the most complex. Naturally it would be sensible for nodes in the most frequently followed paths to be simplest. Thus at step 360, if the y (system configured value) most frequently visited paths (e.g., 3) appear in the top z (system configured value; e.g., 2) in terms of complexity then the user is informed that this is an area of the user interface that requires work. Thus in this example, the nodes in paths 1 and 3 perhaps need some attention. This can be notified to a user interface-designer. This would seem to make sense, since it will be appreciated that in both paths the user has had to retrace their steps to reach their eventual end goal. This would seem to indicate that there is something leading users to follow the wrong route.

Thus a system has been presented which enables a user interface designer to determine which paths in a user interface are most frequently exercised ("golden") and also the complexity of such golden paths. The user interface designer can then take steps to simplify the more complex of the golden paths.

It should be appreciated that the metrics used to calculate complexity are exemplary only.

Figure 2C:
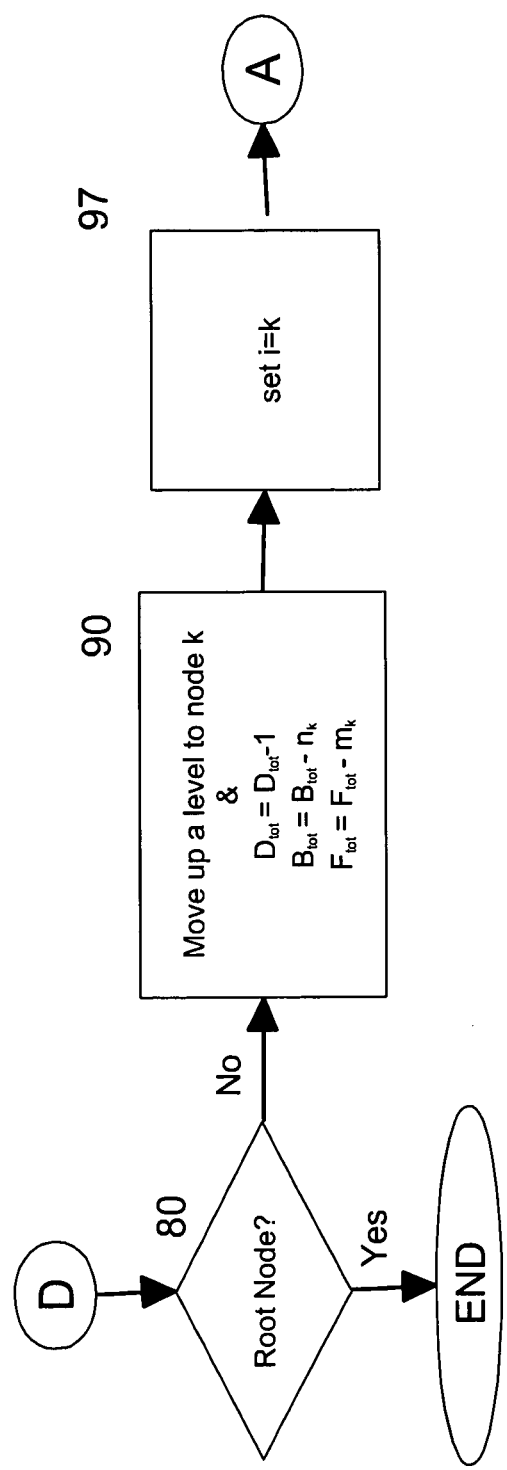
Figure 9:
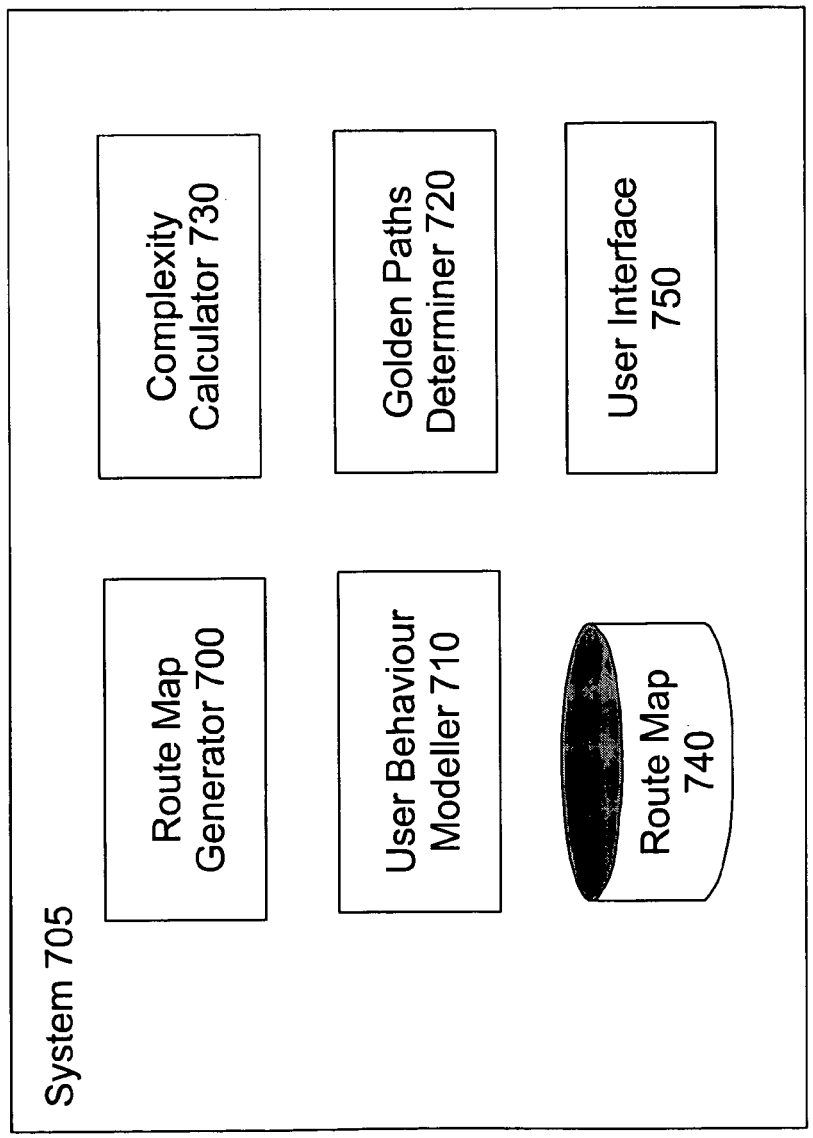
FIG. 9 illustrates the components involved in a first embodiment of the present invention.

FIG. 9 illustrates the components involved in the first embodiment. System 705 comprises a route map generator 700 (processing of FIGS. 2a, 2b and 2c) for creating a conceptual route map of user interface 750 using route map database 740; a user behaviour modeller 710 (processing of FIG. 3); a golden paths determiner 720 (processing of FIG. 4); and a complexity calculator 730 (processing of FIG. 5).

Figure 6:
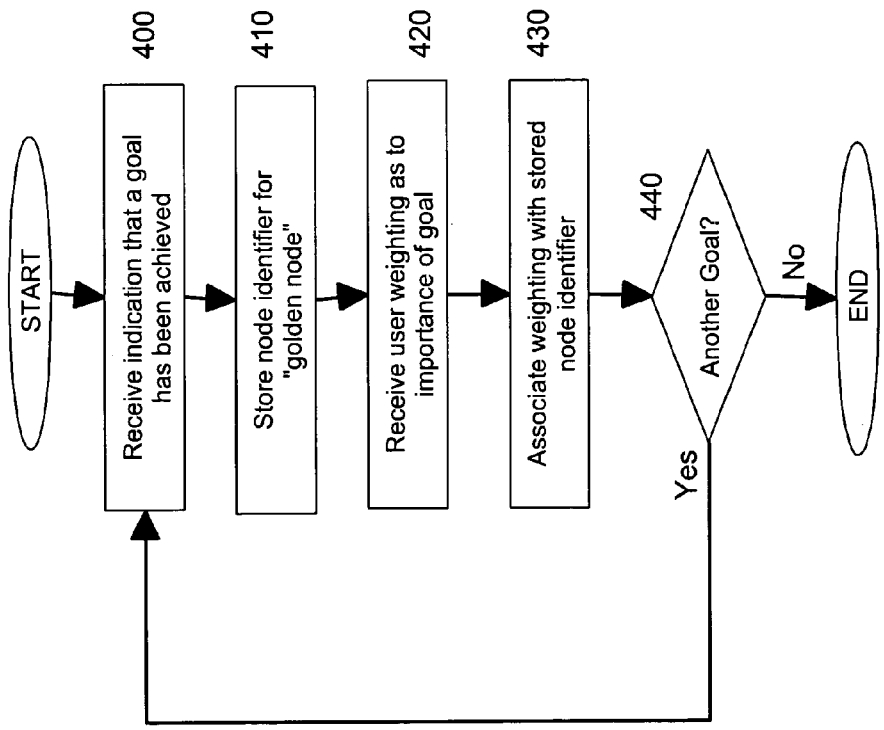
FIG. 6 is a flow chart, in accordance with a second embodiment of the present invention, of the process of determining golden nodes.
Figure 7:
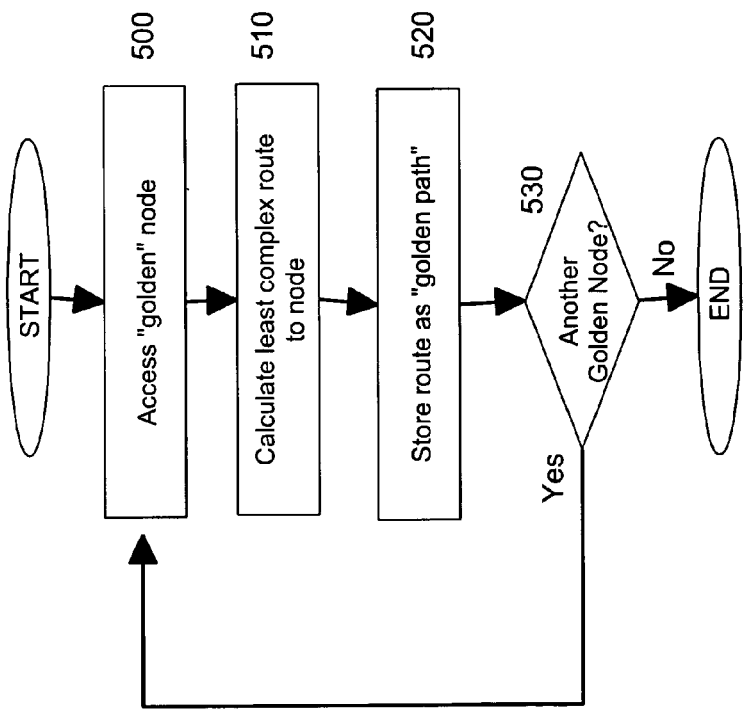
FIG. 7 illustrates, in accordance with a second embodiment of the present invention, the process of determining golden paths.
Figure 8:
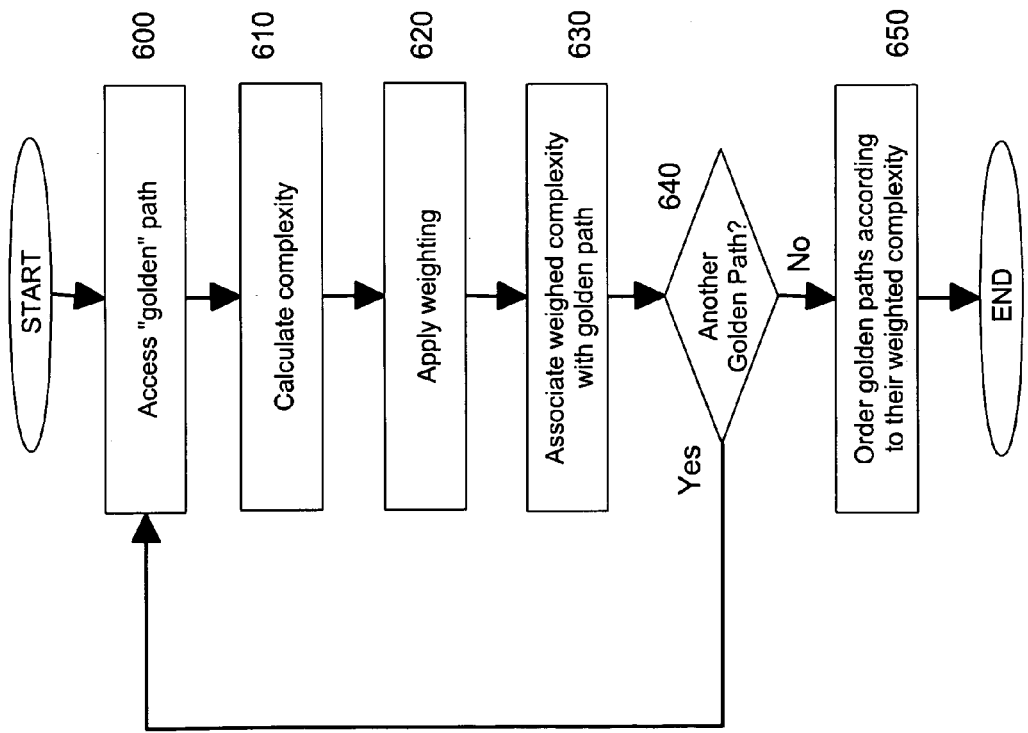
FIG. 8 illustrates, in accordance with a second embodiment of the present invention, the process of calculating the complexity of the golden paths.

FIGS. 6, 7 and 8 show the processing of the present invention in accordance with a second embodiment. In the first embodiment, golden or critical paths are those that are frequently exercised by users of the user interface. In the second embodiment, users identify "golden nodes" (critical nodes). A node is "golden" if it represents a goal desired by a user. The system then calculates the least complex path (route) to that golden node. Such a path is then classified as a "golden path" (critical path) to the golden node. It should be appreciated that, as with the first embodiment, a conceptual route map of the system is first created. Further, the complexity value of each node should be calculated at the same time as an entry for that node is added to the database.

With reference to FIG. 6, an indication is received from a user that a goal has been achieved at step 400 (i.e., that a desired node has been reached). An identifier for the node ("golden node") is then stored (step 410). The user assigns the node a weighting (scale 1-100) indicating how important a goal is at step 420. A critical goal is given a weighting of 100. The process then tests for more goals (step 440) and loops round.

FIG. 7 illustrates the determination of golden paths. At step 500, a golden node is accessed. The least complex route to the golden node is then calculated. It will be appreciated that in the present example, there is only one direct route through the user-interface (i.e., without the user retracing their steps). The calculation of the least complex route is equivalent to the well-known and frequently discussed travelling salesman problem. It will therefore not be discussed in any more detail, suffice to say that the distance between two nodes in the travelling salesman problem is equivalent to the complexity value calculated for the destination node in this embodiment.

At step 520, the calculated route is stored as a golden path. It is then determined at step 530 whether there are any more golden nodes and the process loops round until all golden nodes have been processed.

With reference to FIG. 8, the complexity of the golden paths is then calculated. At step 600, a golden path is accessed. The complexity of the accessed path is calculated at step 610. This calculation is performed in the same manner as the first embodiment. In other words, the complexity of each individual node in a path is calculated and then the complexity values are summed.

At step 620 the weighting is applied to the overall complexity value using the algorithm:

complexity*weighting

The calculated value is then associated with the golden path at step 630. At 640, processing loops round for all additional golden paths.

Once all golden paths have been processed, the listed golden paths are then ordered according to their weighted complexity at step 650. By way of example, the golden paths may be listed in reverse order for this weighted complexity. Then the first w goals may be flagged as overly complex given their assigned weighting.

Figure 10:
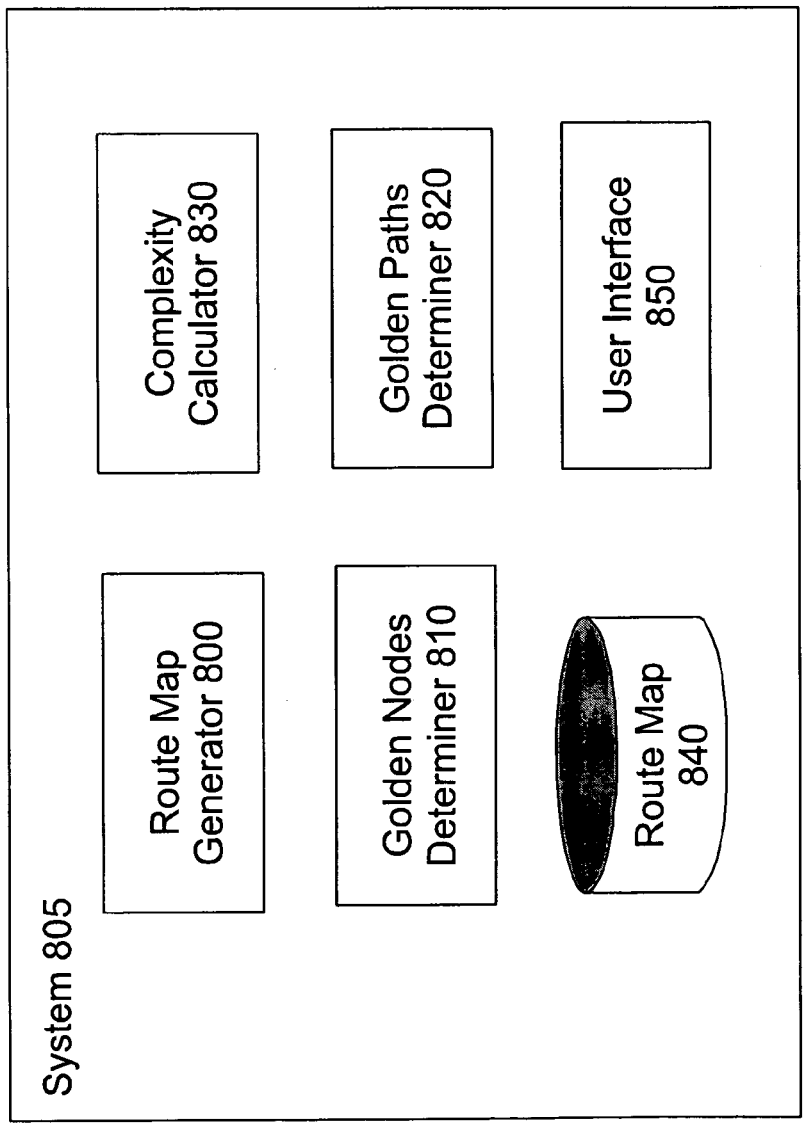
FIG. 10 illustrates the components involved in a second embodiment of the present invention.

FIG. 10 illustrates the components involved in the second embodiment. System 805 comprises a route map generator 800 (processing of FIGS. 2a, 2b and 2c) for creating a conceptual route map of user interface 850 using route map database 840; a golden nodes determiner 810 (processing of FIG. 6); a golden paths determiner 820 (processing of FIG. 7); and a complexity calculator 830 (processing of FIG. 8).

In the first embodiment, the route map of nodes is first created and then the complexity of those nodes is separately calculated. It should however be appreciated that this does not have to be the case. For example complexity values could be calculated alongside the generation of an entry for a node in the database.

It will be apparent that the first embodiment uses weightings implicitly; that is by the number of times a user follows a certain path. The more times they follow a path, the higher the weighting of that goal.

Figure 11:
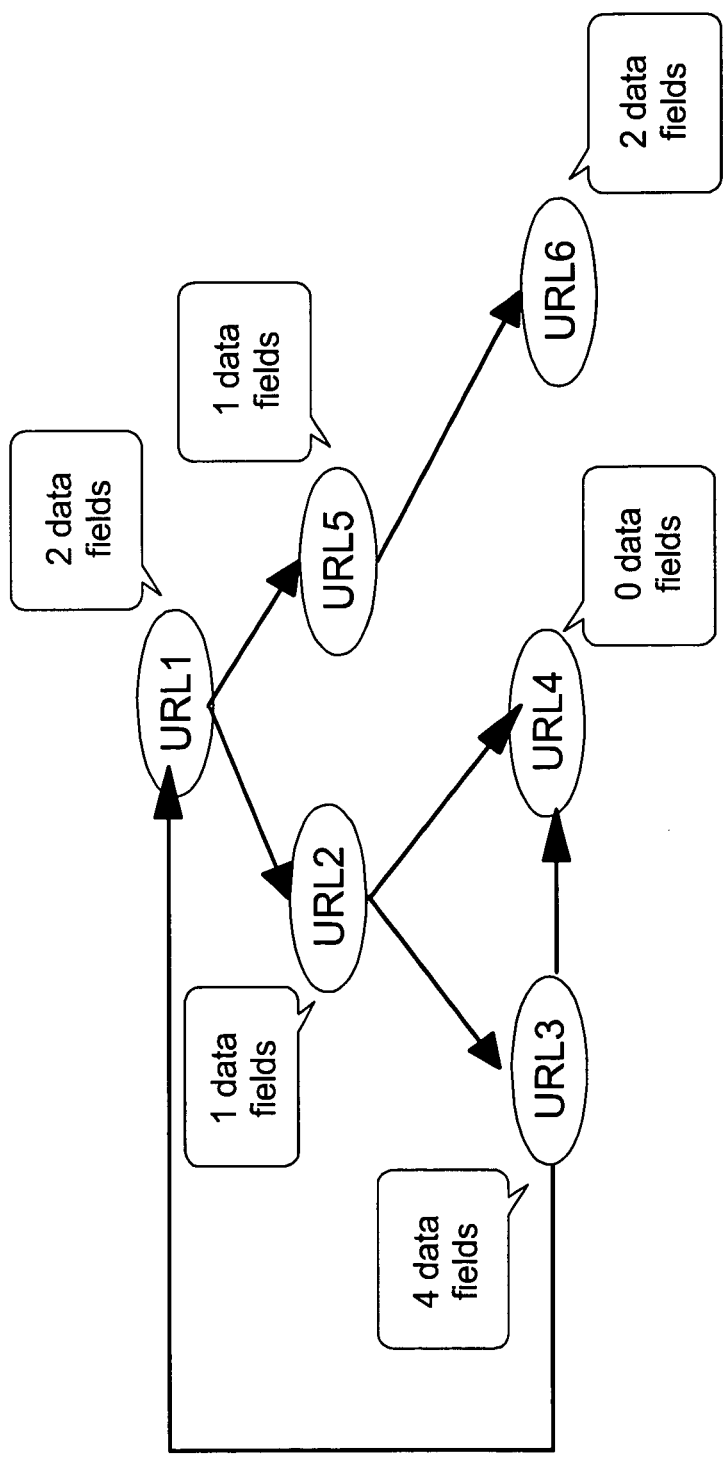
FIG. 11 illustrates an exemplary user interface.

As previously discussed, a user-interface may comprise a more complex grid of nodes. This is shown with reference to FIG. 11. It can be seen from this FIG. 11 that URL3 has a transition back to URL1 and also a further transition to URL4. This can therefore mean that it possible to reach a node via multiple routes. In the example, URL4 can be reached from either URL2 or from URL3. It will be appreciated that dependent upon the route taken, the complexity value associated with URL4 could differ. For example, URL4 has a depth of 3 when reached via URL3 but a depth of only 2 when reached directly from URL2.

To cope with this possibility, the complexity of each node is calculated at the same time as the route map is being generated. If for example, URL4 is reached for the second time but this time via URL3, then the complexity value for node URL4 is held in memory and compared with the previous complexity value for that node as held in the database. If the value in memory is lower than the value in the database, then a more efficient route to the node has been found. The database entry is updated with the current values for $D_{tot}$, $B_{tot}$ and $F_{tot}$ and also the new complexity value. Conversely, if the complexity value held in memory is higher or equal to the equivalent value in the database for the node, then a more efficient route to the node has not been found and the algorithm should return to the calling node. The values for $D_{tot}$, $B_{tot}$ and $F_{tot}$ are then reset to the equivalent values held for the calling node in the database. It should be appreciated that the transition from node URL3 to node URL1 is now considered to be a processed transition.

By way of summary, golden (critical) paths are identified. A path is critical if it is one of the more frequently exercised paths or if it is the shortest path to a golden (critical) node.

The invention claimed is:

1. A method for facilitating improvement of a user interface, the method comprising:
   determining a plurality of critical paths through the user interface, the determining including monitoring paths exercised by users of the user interface as the users traverse nodes of the user interface, and identifying the paths that are most frequently exercised by the users as the users traverse the user interface as critical paths, wherein the monitoring of paths includes, for each node in a path, monitoring:
   a number of data fields associated with the node;
   an accumulated depth $D_i$ of the node indicating a level of the node along the path;
   an accumulated breadth $B_i$ of the node indicating a number of alternative transitions that could be made enroute to the node;
   a number of data fields $F_i$ that need to be filled in to reach the node before a transition to another node can be made; and
   a number of transitions for the node;
   calculating a complexity of each of the critical paths by summing a complexity of each node in the path, the complexity of each node being dependent on $D_i$, $B_i$, and $F_i$; and
   indicating the complexity of the critical paths relative to a level of criticality of those paths.

2. The method of claim 1, wherein determining a plurality of critical paths further comprises:
   having users identify nodes within the user interface as fulfilling their goals; and
   calculating a least complex route through the user interface to each of the identified nodes, wherein the routes calculated comprise critical paths.

3. The method of claim 2, further comprising:
   a user assigning a weighting to each node identified as fulfilling a user's goal.

4. The method of claim 3, comprising:
   identifying the weighting assigned to a final node, identified as fulfilling a user's goal, in a critical path; and
   applying the identified weighting to the complexity associated with the critical path to create a weighted complexity.

5. The method of claim 4, wherein indicating the complexity of the critical paths relative to a level of criticality of those paths comprises:
   indicating the weighted complexity of each critical path relative to a level of criticality of those paths.

6. The method of claim 1, wherein calculating the complexity of the critical paths comprises:
   determining the complexity of nodes forming part of critical paths.

7. The method of claim 6, wherein determining the complexity of nodes forming part of critical paths further comprises:
   for each node, determining at least one of a depth of the node, a breadth of the node, a number of transitions from the node to another node, and a number of data fields that have to be filled in to reach the node.

8. Apparatus for facilitating improvement of a user interface, the apparatus comprising a processor and performing a method comprising:
   determining a plurality of critical paths through the user interface, the determining including monitoring paths exercised by users of the user interface as the users traverse nodes of the user interface, and identifying the paths that are most frequently exercised by the users as the users traverse the user interface as critical paths, wherein the monitoring of paths includes, for each node in a path, monitoring:
   a number of data fields associated with the node;
   an accumulated depth $D_i$ of the node indicating a level of the node along the path;
   an accumulated breadth $B_i$ of the node indicating a number of alternative transitions that could be made enroute to the node;
   a number of data fields $F_i$ that need needed to be filled in to reach the node before a transition to another node can be made; and
   a number of transitions for the node;
   calculating a complexity of each of the critical paths by summing a complexity of each node in the path, the complexity of each node being dependent on $D_i$, $B_i$ and $F_i$; and
   indicating the complexity of the critical paths relative to a level of criticality of those paths.

9. The apparatus of claim 8, wherein the determining a plurality of critical paths further comprises:
   having users identify nodes within the user interface as fulfilling their goals; and
   calculating a least complex route through the user interface to each of the identified nodes, wherein the routes calculated comprise critical paths.

10. The apparatus of claim 9, the method further comprising:
    a user assigning a weighting to each node identified as fulfilling a user's goal.

11. The apparatus of claim 10, the method further comprising:
    identifying the weighting assigned to a final node, identified as fulfilling a user's goal, in a critical path; and
    applying the identified weighting to the complexity associated with the critical path to create a weighted complexity.

12. The apparatus of claim 11, wherein the indicating the complexity of the critical paths relative to a level of criticality of those paths further comprises:

indicating the weighted complexity of each critical path relative to a level of criticality of those paths.

13. The apparatus of claim 8, wherein the calculating the complexity of the critical paths further comprises:
   determining the complexity of nodes forming part of critical paths.

14. The apparatus of claim 13, wherein the determining the complexity of nodes forming part of critical paths further comprises:
   for each node, determining at least one of a depth of the node, a breadth of the node, a number of transitions from the node to another node, and a number of data fields that have to be filled in to reach the node.

* * * * *